United States Patent [19]

Diem et al.

[11] 3,928,461

[45] Dec. 23, 1975

[54] PRODUCTION OF FORMALDEHYDE

[75] Inventors: Hans Diem; Guenther Matthias, both of Ludwigshafen; Albrecht Aicher, Frankenthal-Studernheim; Hans Haas, Ludwigshafen; Hans Schreiber, Ludwigshafen; Heinrich Sperber, Ludwigshafen, all of Germany

[73] Assignee: Badische Anilin- & Soda-Fabrik Aktiengesellschaft, Ludwigshafen (Rhine), Germany

[22] Filed: June 21, 1973

[21] Appl. No.: 372,257

[30] Foreign Application Priority Data

June 26, 1972 Germany............................ 2231248

[52] U.S. Cl. .......................................... 260/603 HF
[51] Int. Cl.$^2$.......................................... C07C 45/15
[58] Field of Search............................ 260/603 HF

[56] References Cited
UNITED STATES PATENTS

| | | | |
|---|---|---|---|
| 2,462,413 | 2/1949 | Meath........................... | 260/603 HF |
| 2,465,498 | 3/1949 | Uhl et al........................ | 260/603 HF |
| 2,504,402 | 4/1950 | Field............................. | 260/603 HF |
| 2,614,125 | 10/1952 | Detling et al. ................. | 260/604 R |
| 2,908,715 | 10/1959 | Euguchi et al................. | 260/603 HF |
| 3,272,868 | 9/1966 | Stiles............................. | 260/603 HF |
| 3,318,955 | 5/1967 | Gerloff et al. ................. | 260/603 HF |

FOREIGN PATENTS OR APPLICATIONS

| | | | |
|---|---|---|---|
| 1,491,381 | 7/1967 | France.......................... | 260/603 HF |

OTHER PUBLICATIONS

Walker, Formaldehyde, 2nd. Edit., 1953, pp. 12–19.

*Primary Examiner*—James O. Thomas, Jr.
*Assistant Examiner*—R. H. Liles
*Attorney, Agent, or Firm*—Johnston, Keil, Thompson & Shurtleff

[57] ABSTRACT

A process for producing formaldehyde by oxidizing dehydrogenation of methanol in the presence of a silver catalyst, wherein a vaporous mixture of water and oxygen is introduced into the vaporous starting mixture containing water, methanol and oxygen before entry into the catalyst bed. Formaldehyde produced by the process is a disinfectant, tanning agent, reducing agent and raw material for the production of synthetic resins, adhesives and plastics.

13 Claims, No Drawings

PRODUCTION OF FORMALDEHYDE

The present invention relates to a process for producing formaldehyde by oxidizing dehydrogenation of methanol in the presence of a silver catalyst, wherein a vaporous mixture of water and oxygen is introduced into the vaporous starting mixture containing water, methanol and oxygen before entry into the catalyst bed.

In Ullmann's Encyklopadie der technischen Chemie, volume 7, pages 659 et seq., various processes for the production of formaldehyde by the oxidizing dehydrogenation of methanol in the presence of a silver catalyst at elevated temperatures are described. An aqueous methanol solution is used as feedstock.

From Belgian Pat. No. 683,130 it is known that a concentrated aqueous formaldehyde solution can be produced by passing an anhydrous methanol-air mixture over a silver catalyst in the presence of inert gases, followed by absorption of the formaldehyde thus formed in water.

In U.S. Pat. No. 2,465,498 the reaction of methanol and air with from 20 to 40 percent by weight of water, based on the weight of methanol, at 540° to 580°C, is described. Optimum yields of formaldehyde are said to be achieved in the absence of water or in the presence of relatively small amounts of water (column 2, lines 34 to 40; column 3, lines 19 to 25; column 7). Such conditions, however, favor the formation of by-products of methanol. It is also stated that water plays a part in numerous and complex reactions, so that the influence of water on the production of formaldehyde cannot be predicted (column 3, lines 32 to 38). The same patent mentions the decrease in temperature occasioned by the addition of water (column 3, lines 45 to 49).

In all these processes the rate of reaction and thus the heat evolved or the temperature on and in the catalyst bed is difficult to control. Accordingly, continuous long-term commercial operation leads to fluctuations in catalyst and thus to fluctuations in the yield and space-time yield of formaldehyde and in the methanol content of the aqueous formaldehyde soutions obtained at the absorption stage, and frequently pronounced formation of by-products, for example formic acid, as well as short catalyst life.

These difficulties occur particularly in large plants with a plurality of reactors or large-diameter catalyst beds, for example larger than 1.2 meters in diameter. An additional serious difficulty arises when reactors are arranged in parallel, for instance a group of 2 to 10 units. The reaction temperatures of the catalyst beds of the various reactors almost always differ within the group. The cause of such differences may be variation in the nature of the catalyst metal or differences in the age of the various catalysts, since the catalysts are normally regenerated at different intervals. Further causes are irregularities in the distribution of the silver when the catalyst is placed in the reactor, and varying pressure losses in the individual reactors and in the various pipes resulting from differences in design. The temperature differences between the various reactors can be quite small initially, for example 10° to 15°C, but during on-stream periods can increase considerably, for example to between 30° and 80°C. In certain circumstances it may also be desirable to raise the temperature of a reactor: for example poisoning of the catalyst can often be remedied by a suitable increase in temperature.

The object of this invention is to provide a new and simple process for the manufacture of formaldehyde, which process gives improved and more consistant results in respect of yield, space-time yield and purity.

We have found that formaldehyde may advantageously be obtained by the oxidizing dehydrogenation of methanol in the presence of a silver catalyst at elevated temperatures, if the reaction is carried out at 550° to 750°C and if during the reaction a vapor mixture heated to at least 70°C and if during the reaction a vapor consisting of 0.05 to 0.8 moles of water and 0.005 to 0.06 moles of oxygen, based on 1 mole of feed methanol, is introduced into the vaporous methanolic starting mixture which has been heated to at least 60°C and contains water in a molar ratio of 0.09 to 1.8 and oxygen in a molar ratio of 0.35 to 0.5, based on 1 mole of methanol, before said starting mixture enters the catalyst bed, the space velocity being 0.9 to 3 metric tons of methanol, calculated 100%, per square meter of catalyst bed cross-section per hour.

In contrast to known processes the process of this invention is easy to carry out and gives improved and more consistent overall results in terms of yield, space-time yield and purity. Surprisingly, these advantages are achieved by the use of a comparatively high total water concentration in the reaction mixture. The improved temperature control is of particular benefit, since it permits a substantially constant, optimum reaction temperature to be maintained in and on the catalyst. Reaction rate and space-time yield are improved in comparison with known processes. The improved temperature control and thus the more stable reaction conditions attainable by the use of the process of this invention are of particular importance in continuous long-term industrial operation in plants with two or more reactors arranged in parallel and reactors with catalyst beds of large diameter. Better yields of product, less formation of formic acid, higher conversions of methanol and a prolonged catalyst life are therefore obtained. Differences in the catalyst bed temperatures of reactors arranged in parallel, and concomitant disadvantages, are avoided. Similarly, despite the addition of air operating safety is not reduced, since the composition of the reaction mixture is outside the explosive range of methanol-air mixtures. All these beneficial results are surprising in the light of the prior art.

Feedstocks suitable for use in the process are pure methanol and technical methanol, usually mixed with water; the concentration of aqueous mixtures may vary between 50 and 95 percent by weight of methanol, preferably between 70 and 90 percent by weight of methanol. Crude methanol, normally purified by the processes described in German Application DAS 1,277,834 and German Pat. No. 1,235,881 by treatment with oxidizing agents and/or alkalies, can also be used. The methanol is introduced into the reaction vessel in the form of a vapor, either alone or mixed with recirculated off-gas and/or with inert gas. An example of an inert gas which can be used for the process is nitrogen. Oxygen or air and water vapor can be combined with methanol vapor in a mixing unit; however, it is customary to vaporize water and methanol together and add the air in the evaporator.

Both oxygen alone and a gas containing oxygen, in particular air, may be used as the oxidizing agent. Oxygen and methanol can be used with advantage in a molar ratio of 0.39 to 0.46 mole of oxygen ($O_2$) per mole of methanol. The water content of the starting mixture should preferably be in a molar ratio of 0.2 to 1, in particular of 0.3 to 0.5 per mole of methanol (feed methanol). Oxidation may if desired be carried out in the presence of 1 to 2, or more advantageously 1 to 1.65 moles, and in particular 1.3 to 1.5 moles of off-gas per mole of methanol. It is preferably for the total amount of water vapor and air added to the off-gas not to exceed 3.0 moles per mole of methanol. The starting mixture of all the abovementioned gases and vapors is heated to at least 60°C, preferably to 70° to 90°C.

Any silver catalysts are suitable for the process of this invention, for example those described in German Patent Application DAS 1,231,229 and in Ullmann's Encyklopadie der technischen Chemie, volume 7, pages 659 et seq. Preference is given to the use of double bed silver catalysts, for example those referred to in German Patent Application DAS 1,294,360 and in German Pat. No. 1,903,197 (Patent Application P 19 03 197.1). Reference is made in connection with the production of the catalyst and the relevant reactions to the publications named above. A preferred embodiment of the process of the invention consists in carrying out the reaction on a double bed catalyst, the lower bed of which is 15 to 40 mm, in particular 20 to 30 mm thick and comprises at least 50 percent by weight of crystals of particle size of 1 to 4 mm, in particular 1 to 2.5 mm, and the upper bed of which is 0.75 to 3 mm, in particular 1 to 2 mm thick and comprises crystals of particle sizes from 0.1 to 1 mm, in particular from 0.2 to 0.75 mm, the space velocity being 1 to 2.4 metric tons, more particularly 1.4 to 2.2 metric tons, of methanol per $m^2$ of catalyst bed cross-section per hour. For commercial operation of the process catalyst bed diameters of at least 0.5 m, more advantageously 1 to 3 meters, are preferred. For single bed catalysts the space velocity is normally the same as for double bed catalysts.

Oxidation is effected in known manner, for example by passing a gas mixture consisting of methanol vapor, water vapor, oxygen and any inert gas and/or off-gas in the previously stated amounts through the silver catalyst at temperatures between 550° and 750°C, more particularly between 600° and 720°C. It is convenient in this process to cool the reaction gases leaving the catalyst zone within a brief period of time, for example in less than 1/10 of a second, for example to a temperature between 120° and 170°C. The cooled gas mixture can then be passed with advantage to an absorber in which the formaldehyde is scrubbed from the gas mixture with water, advantageously countercurrently. It is desirable that part of the remaining off-gas then be permitted to escape and the remainder be recycled.

The process is usually carried out continuously at pressures between 0.5 and 2, preferably between 0.8 and 1.8, atmospheres gauge.

Before the starting mixture enters the catalyst bed an additional vaporous mixture heated to at least 70°C, and preferably to between 80° and 300°C, in particular to between 100° and 150°C, comprising preferably 0.2 to 0.65, and in particular 0.3 to 0.5 mole of water and preferably 0.01 to 0.045, in particular 0.01 to 0.03 mole of oxygen ($O_2$), based on 1 mole of methanol in the starting mixture (feed methanol) is added to the starting mixture. The additional mixture may be introduced at any desired point in the feed line between the point of entry of the starting mixture into the reactor and the catalyst bed, preferably 0.5 to 3 meters ahead of the point where said starting mixture reaches the catalyst bed.

If the plurality of reactors arranged in parallel, preferably two (twin reactor), is used, it is customary to provide a number of feed lines for the additional mixture corresponding to the number of reactors. In such cases the plant can consist of a plurality of reactors with a corresponding number of upstream evaporators and downstream absorbers and associated feed and discharge lines. It is, however, more convenient for a single evaporator to supply the vaporous starting mixture, for example, for a twin reactor by way of a main pipe which divides into two branches; in this case each branch includes a feed line for the additional mixture and the reaction zone with the catalyst. In this case the position of the feed line is between the fork in the main pipe and the reaction zone, for example approximately 200 cm before the catalyst bed is reached. Both branch pipes preferably conduct the reaction mixture emerging from the reaction zone into a common main pipe with only one absorber.

A plant with several reactors arranged in parallel and in particular the twin reactors represeents a preferred embodiment of the process of the invention. It is possible to carry out the process of the invention in both branch lines. However, it is also possible to carry out the reaction in only one branch line and to react the starting mixture in the other branch line without the introduction of additional mixture. An additional preferred variation of this embodiment is represented by the alternating employment of the process of the invention in the branch lines of a twin reactor: the reaction is started in both branches in accordance with the process of the invention by introducing additional mixture, and after a certain time, for example 2 hours before a catalyst change in one branch, the introduction of the additional mixture is terminated in both branches. One branch (a) remains without additional mixture, whereas in the other branch (b) the catalyst is regenerated, placed in the reactor and said branch (b) then operated again in accordance with this invention with introduction of additional mixture. After a certain time, for example shortly before a catalyst change in the first branch (a), introduction of additional mixture into the second branch (b) is terminated and said branch (b) operated with starting mixture alone, while the individual operations involved in catalyst change and restarting the process in accordance with the invention are carried out in the first branch (a). In this way the process of this invention is operated in the two branch lines alternately. In a similar manner it is possible to employ the process of the invention under the conditions described above in a twin reactor using a known process or in a single reactor for a limited period, for example for start-up or after a catalyst change or during operation for rapid adjustment of the reaction temperature. Similar variations to that described here with reference to a twin reactor can be employed for a larger group of reactors arranged in parallel.

It is possible in all the cases referred to above, and beneficial particularly when catalyst beds of large diameter are used, to raise the catalyst temperature in a series of steps, for example to start the reaction at a relatively low temperature and to continue it at a higher temperature, additional mixture preferably being added at the higher temperature. Special benefits are afforded by a combination of the process of the invention with the abovementioned process using two temperature levels when the plant is being started up or following a catalyst change, in particular when a twin reactor or a plurality of reactors arranged in parallel are used. An advantage can frequently be obtained in all said cases, and in particular when crude methanol is sued as feedstock and/or when the catalyst beds are of large diameter, by installing baffles downstream of the feed point for the additional mixture but before the point of entry to the catalyst bed. The impurities collecting at the baffles are removed. By way of example, the process of the invention can be advantageously combined with the process described in German Pat. No. 2,114,370 (Patent Application P 21 14 370.4) and if desired with the process described in German Pat. Application No. P 22 23 993.6.

An additional embodiment of the process is as follows: part of the off-gas is permitted to escape after absorption of the formaldehyde, and the remainder is returned to the reaction. The proportion of the off-gas returned to the reaction is between 1 and 2 moles, based on 1 mole of the crude methanol feed. The off-gas contains primarily nitrogen, hydrogen, carbon dioxide, carbon monoxide, water, methanol, argon and usually from 0.1 to 0.5 gram of formaldehyde in 1 cubic meter. It is conveniently treated with a basic compound, preferably in a quantity which sets up a pH of at least 10, and preferably 11 to 13.4, and/or oxidizing agents, mixed with the remaining components of the feed and then re-introduced into the reaction vessel. Such basic compounds are conveniently alkalis, such as solid hydroxides or hydroxides dissolved in water, oxides or carbonates of alkali metals or alkaline earth metals or other substances having an alkaline reaction, for example alkali metal alkoxides or strongly basic, usually high-boiling, amines, such as triethanolamine. Oxidizing agents are for example hydrogen peroxide, sodium peroxide in aqueous solution, perborates, percarbonates, preferably mixed with water, potassium permanganate and chromic acid, suitably in the form of aqueous 0.5 to 10 weight percent solutions. In general 0.02 to 10 g of oxidizing agent per cubic meter of off-gas is used. Treatment is generally carried out continuously at a temperature between 20° and 150°C, with or without pressure. A two-stage treatment, preferably first with the basic compound and then with the oxidizing agent, is also possible. The process described in German Pat. No. 2,022,818 (Patent Application P 20 22 818.6) is preferred for the treatment of the off-gas.

The formaldehyde which can be produced by the process of this invention is a disinfectant, tanning agent, reducing agent and valuable raw material for the manufacture of synthetic resins, adhesives and plastics. Reference is made in connection with the use of said formaldehyde to the previously cited volume of Ullmann, page 670.

The parts specified in the following Examples are parts by weight. Yields are given in percent of theory, based on the weight of feed methanol (calculated 100%).

EXAMPLE 1

A twin reactor contains in each section a catalyst bed of 2 m diameter with 2 layers of silver crystals, the lower of these having a thickness of 18 mm and being made up of crystals with a particle size of 1.5 to 3 mm, and the upper layer having a thickness of 2.7 mm and comprising crystals with a particle size of 0.2 to 1 mm.

The two reactors are supplied from an evaporator with a gas/vapor mixture consisting of crude methanol, water and air and having a temperature of 70°C at a pressure of 1.04 atmospheres gauge, in a methanol:water:air ratio of 4,210:2,874:7,480 parts. 4,210 parts, of methanol per hour per reactor are introduced. The space velocity is 1.5 metric tons of methanol per square meter of catalyst bed cross-section per hour in either case. A temperature of 700°C is set up at the catalyst of one reactor and a temperature of 685°C at the catalyst of the other reactor. By introduction of 460 parts per hour of water vapor and 450 parts per hour of air into the feed line of the second reactor, a temperature of 700°C is set up in the catalyst of the second reactor. No temperature fluctuations occur.

The reaction mixture is cooled continuously to 150°C after which it is absorbed in water in an absorber after further cooling. 3,480 parts of formaldehyde per hour (calculated 100%) are obtained in the form of a 40 percent by weight aqueous solution with a methanol content of 1.02 weight percent and a formic acid content of 0.0074 percent by weight. This corresponds to a yield of 88.1 percent of the theory based on the methanol fed in. The yield of end product and the methanol content of the formaldehyde solution remain constant over a period of 100 days. No cracks occur in the catalyst bed.

COMPARATIVE EXAMPLE

A reaction similar to that described in Example 1 is carried out without additional mixture. After 50 days a temperature difference of 58°C between the first reactor (700°) and the second reactor (642°C) is observed. The yield from the second reactor drops from 87.8% to 86.8% of theory during the 50-day period. Formaldehyde is obtained in the form of a 40 percent by weight aqueous solution with a methanol content which increases during the 50-day period from 1.75 percent to 2.14 percent by weight, and also with a formic acid content of 0.0078 percent by weight. The catalyst bed exhibits cracks.

EXAMPLES 2 TO 5

These Examples are summarized in the following table. The reaction is in each case performed similarly to Example 1. The life of the catalyst demonstrates the regularity of the results (yield, formic acid content and methanol content).

| Number of experiment | Temperature first reactor, °C | Temperature second reactor before introduction of additional mixture, °C | after introduction of additional mixture, °C | Parts of methanol per hour per reactor | Space velocity metric tons/m²h | Additional to second | mixture reactor |
|---|---|---|---|---|---|---|---|
| | | | | | | Parts of air per hour | Parts of water vapor per hour |
| 2 | 700 | 670 | 700 | 5,600 | 2 | 546 | 1,051 |
| 3 | 690 | 610 | 690 | 5,600 | 2 | 820 | 672 |
| 4 | 680 | 710 | 680 | 4,210 | 1.5 | 274 | 1,550 |
| 5 | 705 | 675 | 705 | 4,210 | 1.5 | 546 | 1,138 |

-continued

| Number of experiment | Temperature first reactor, °C | Temperature second reactor before introduction of additional mixture, °C | after introduction of additional mixture, °C | Parts of methanol per hour per reactor | Space velocity metric tons/ m²h | Additional to second reactor Parts of air per hour | mixture reactor Parts of water vapor per hour |
|---|---|---|---|---|---|---|---|
| Number | | Yield of formaldehyde % of theory | | Formic acid, % | | Methanol, % | Life in days |
| 2 | | 88.2 | | 0.0075 | | 1.1 | 82 |
| 3 | | 88.1 | | 0.0048 | | 1.4 | 105 |
| 4 | | 88.1 | | 0.0069 | | 1.1 | 98 |
| 5 | | 88.3 | | 0.0080 | | 1.2 | 98 |

We claim:
1. A process for producing formaldehyde by oxidizing dehydrogenation of methanol in the presence of a silver catalyst at elevated temperatures, wherein the reaction is carried out at a temperature of 550° to 750°C and during the reaction an additional vapor mixture heated to at least 70°C and consisting of 0.05 to 0.8 mole of water and 0.005 to 0.6 mole of oxygen based on 1 mole of feed methanol is introduced, into the vaporous methanolic starting mixture which has been heated to at least 60°C and contains water in a molar ratio of 0.09 to 1.8 and oxygen in a molar ratio of 0.35 to 0.5, based on 1 mole of methanol, before said starting mixture enters the catalyst bed, the space velocity being 0.9 to 3 metric tons of methanol, calculated 100%, per square meter of catalyst bed cross-section per hour, said reaction being carried out in a plurality of reactors arranged in parallel, each reactor having a bed of said silver catalyst of a diameter of at least 0.5 meters, said starting mixture being fed to the respective reactors via a branch line connecting each respective reactor with a main supply pipe for said starting mixture, and said additional vapor mixture being fed into at least one of said reactors at a point ahead of the entry of said starting mixture into said catalyst bed.

2. A process according to claim 1, wherein the oxygen necessary for the reaction is introduced as air.

3. A process according to claim 1, wherein the reaction is carried out with said starting mixture of gases and vapors heated to a temperature of from 70° to 90°C.

4. A process according to claim 1, wherein the reaction is carried out at a temperature of from 600° to 720°C.

5. A process according to claim 1, wherein the reaction is carried out at a gauge pressure of from 0.5 to 2 atmospheres.

6. A process according to claim 1, wherein the reaction is carried out at a molar ratio in said starting mixture of from 0.39 to 0.46 mole of oxygen ($O_2$) per mole of methanol and a molar ratio of 0.2 to 1 mole of water per mole of feed methanol.

7. A process according to claim 1, wherein the reaction is carried out at a molar ratio in said starting mixture of 0.39 to 0.46 mole of oxygen ($O_2$) per mole of methanol and a molar ratio of 0.3 to 0.5 moles of water per mole of feed methanol.

8. A process according to claim 1, wherein the reaction is carried out with said additional mixture heated to 100° to 150°C.

9. A process according to claim 1, wherein the reaction is carried out with said additional mixture containing 0.2 to 0.65 mole of water and 0.01 to 0.045 mole of oxygen ($O_2$) per mole of methanol in the starting mixture (feed methanol).

10. A process according to claim 1, wherein the reaction is carried out together with said additional mixture containing from 0.3 to 0.5 mole of water and 0.01 to 0.03 mole of oxygen ($O_2$) per mole of methanol in the starting mixture (feed methanol).

11. A process according to claim 1, wherein the additional mixture is introduced at a point 0.5 to 3 meters upstream of the catalyst bed.

12. A process according to claim 1, wherein said plurality of reactors comprises a twin reactor with two reactors arranged in parallel.

13. A process according to claim 1 in which said additional vapor mixture is fed into said branch line at a point 0.5 to 3 meters upstream from the catalyst bed.

* * * * *